US010419549B2

(12) United States Patent
Barablin et al.

(10) Patent No.: US 10,419,549 B2
(45) Date of Patent: Sep. 17, 2019

(54) CONTENT STREAMING APPARATUS FOR TRANSFERRING A STREAMING SESSION TO ANOTHER APPARATUS

(71) Applicant: ARRIS Enterprises LLC, Suwanee, GA (US)

(72) Inventors: Dmitry Barablin, Lawrenceville, GA (US); Scott Stilwell, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/628,000

(22) Filed: Jun. 20, 2017

(65) Prior Publication Data
US 2017/0289272 A1  Oct. 5, 2017

Related U.S. Application Data

(63) Continuation of application No. 14/710,977, filed on May 13, 2015, now Pat. No. 9,716,763.

(51) Int. Cl.
*H04L 29/08* (2006.01)
*H04L 29/06* (2006.01)

(52) U.S. Cl.
CPC ........ *H04L 67/148* (2013.01); *H04L 65/1026* (2013.01); *H04L 65/4069* (2013.01)

(58) Field of Classification Search
CPC .................................................... H04L 67/148
USPC ........................................................ 709/219
See application file for complete search history.

(56) References Cited

U.S. PATENT DOCUMENTS

| 5,375,123 | A | * | 12/1994 | Andersson | ............ H04L 1/1614 370/333 |
| 6,009,328 | A | * | 12/1999 | Muszynski | ............ H04B 7/022 455/436 |
| 6,659,947 | B1 | * | 12/2003 | Carter | .................. A61B 5/0006 600/300 |
| 6,678,740 | B1 | * | 1/2004 | Rakib | .............. G08B 13/19656 348/E7.069 |
| 7,149,772 | B1 | | 12/2006 | Kalavade | |

(Continued)

OTHER PUBLICATIONS

Wikipedia, "roaming", 2018 (Year: 2108).*

(Continued)

*Primary Examiner* — Ondrej C Vostal
(74) *Attorney, Agent, or Firm* — Bart A. Perkins

(57) ABSTRACT

A content streaming apparatus that includes a gateway streaming manager which determines whether a client device has roamed out of a wireless zone of the content streaming apparatus into a wireless zone of another content streaming apparatus, and when the client device has roamed, sends a tuner reservation instruction to the other content streaming apparatus to instruct the other content streaming apparatus to reserve a tuner in advance of a transfer of the streaming session. The gateway streaming manager receives a tuner reservation confirmation from the other content streaming apparatus, and sends an alternate streaming notification to the client device. The gateway streaming manager receives an alternate streaming acceptance from the client device, and ends the streaming session between the content streaming apparatus and the client device when the alternate streaming acceptance is received.

15 Claims, 7 Drawing Sheets

(56) References Cited

U.S. PATENT DOCUMENTS

| | | | | |
|---|---|---|---|---|
| 7,380,264 B2* | 5/2008 | Potrebic | ............... | H04H 40/18 348/E5.007 |
| 8,064,401 B2* | 11/2011 | Anigstein | ............ | H04W 36/06 370/328 |
| 8,275,377 B2* | 9/2012 | Nanda | ............... | H04W 36/0083 370/331 |
| 8,422,460 B2* | 4/2013 | Jain | ...................... | H04W 36/32 370/332 |
| 8,495,236 B1 | 7/2013 | Glasser | | |
| 8,925,044 B2* | 12/2014 | Woodward | ............. | H04W 8/02 455/433 |
| 2002/0045435 A1* | 4/2002 | Fantaske | ............... | H04L 1/0002 455/403 |
| 2002/0191557 A1* | 12/2002 | Chow | ................ | H04L 12/2801 370/329 |
| 2003/0193619 A1* | 10/2003 | Farrand | ............ | H04N 5/44543 348/731 |
| 2005/0066024 A1* | 3/2005 | Crocitti | .............. | H04L 12/2805 709/223 |
| 2005/0125832 A1* | 6/2005 | Jost | ................... | H04N 7/17336 725/95 |
| 2006/0146861 A1* | 7/2006 | Maeda | ...................... | H04L 5/06 370/448 |
| 2006/0239183 A1* | 10/2006 | Robitaille | ............... | G06F 1/266 370/217 |
| 2006/0281461 A1* | 12/2006 | Kwun | .................. | H04W 28/18 455/436 |
| 2007/0070948 A1* | 3/2007 | Kezys | .................. | H04L 12/6418 370/331 |
| 2007/0220547 A1* | 9/2007 | Teskey | .................. | H04N 7/106 725/39 |
| 2007/0300252 A1* | 12/2007 | Acharya | ................ | H04N 7/165 725/25 |
| 2008/0059607 A1 | 3/2008 | Schneider | | |
| 2008/0062318 A1* | 3/2008 | Ellis | .................. | H04N 5/44543 348/564 |
| 2008/0076432 A1* | 3/2008 | Senarath | .............. | H04W 36/18 455/442 |
| 2008/0250133 A1* | 10/2008 | Lee | ......................... | H04L 12/66 709/223 |
| 2009/0094349 A1* | 4/2009 | Smith | .................. | H04W 76/10 709/220 |
| 2009/0172747 A1 | 7/2009 | Vantalon et al. | | |
| 2010/0217837 A1 | 8/2010 | Ansari et al. | | |
| 2010/0242079 A1 | 9/2010 | Riedl et al. | | |
| 2011/0013633 A1* | 1/2011 | Klein | .................... | H04L 12/185 370/390 |
| 2011/0014899 A1 | 1/2011 | Cugnini et al. | | |
| 2011/0093900 A1 | 4/2011 | Patel et al. | | |
| 2011/0222549 A1* | 9/2011 | Connelly | .................. | G06F 8/65 370/401 |
| 2012/0173753 A1 | 7/2012 | Moorthy | | |
| 2012/0243507 A1* | 9/2012 | Du | .................... | H04W 36/0072 370/331 |
| 2012/0314705 A1* | 12/2012 | Howard | .................. | H04L 45/00 370/390 |
| 2014/0295907 A1* | 10/2014 | Luo | ..................... | H04W 52/241 455/522 |
| 2014/0351383 A1* | 11/2014 | Wan | ...................... | H04L 65/605 709/219 |
| 2015/0052568 A1* | 2/2015 | Glennon | .............. | H04N 21/482 725/100 |
| 2015/0135206 A1 | 5/2015 | Reisman | | |
| 2015/0163501 A1 | 6/2015 | Cho | | |
| 2016/0142743 A1 | 5/2016 | Nielsen et al. | | |
| 2016/0149984 A1* | 5/2016 | Prajapat | .................. | H04L 65/80 370/329 |
| 2016/0205224 A1* | 7/2016 | Chini | ...................... | H04L 69/08 455/422.1 |
| 2016/0261657 A1 | 9/2016 | Bruhn et al. | | |

OTHER PUBLICATIONS

Technopedia, "roaming", 2019 (Year: 2019).*
Your Dictionary, "roaming", 2019 (Year: 2019).*
IEEE Computer Society, "IEEE Standard for Ethernet", Standard 802.3, Clause 14, 2015 (Year: 2015).*
MoCA Alliance, "MoCA 1.1 Specification for Device RF Characteristics", 2014 (Year: 2014).*
"TV Tuner card", Microsoft Computer Dictionary, Fifth Edition, p. 533, 2002.
Gagnon, et al., "Development of an ATSC Multimedia Datacasting Receiver", SPIE Digital Library, Multimedia Systems and Applications, vol. 5241, p. 192-201, 2003.
Carinon, et al., "Data Broadcasting and Interactive Television", Proceedings of the IEEE, vol. 94, No. 1, Jan. 2006.

* cited by examiner

CONTENT STREAMING APPARATUS FOR TRANSFERRING A STREAMING SESSION TO ANOTHER APPARATUS

CROSS REFERENCE TO RELATED APPLICATION

This application is a Continuation of U.S. patent application Ser. No. 14/710,977 entitled "Content Streaming Apparatus for Transferring a Streaming Session to Another Apparatus," filed on May 13, 2015, and is incorporated herein by reference in its entirety.

BACKGROUND

It is becoming increasingly common for content consumers to receive audio content and audio video (A/V) content on a client device, such as a mobile device, via wireless in a home or other facility. A wireless gateway connected to the internet transmits selected data which is then received by the mobile device. It is also becoming increasingly prevalent to receive audio content and A/V content from a cable television provider into the home by a wired connection or satellite, and then to the client device via a wireless communication.

For streaming such audio and A/V content, a streaming session is established between the client mobile device and the wireless gateway. When the mobile device and the wireless gateway are engaged in a streaming session, the content is streamed as a data stream from the wireless gateway to the mobile device as a wireless radio signal. The streaming session can be implemented according any known media streaming communications protocols, including protocols where a continuous stream of data is broken into smaller pieces which are transmitted.

It is also becoming increasingly common for houses or other facilities to have two or more wireless gateway devices. For example, the house or facility may have plural gateway devices including a Gateway 1 and a Gateway 2. Problems in streaming sessions from a cable provider can occur in such an environment. For example, when Gateway 1 is engaged in a streaming session with a client device, Gateway 1 is the wireless access point (such as a WiFi enabled access point) to route the content from the outside network, such as the cable television provider, by wireless communication to the client device. When the mobile client device moves out of the wireless zone of Gateway 1 into the wireless zone of the another gateway device, e.g., Gateway 2, a wireless handoff occurs from Gateway 1 to Gateway 2. However, Gateway 1 remains the source of the content for the streaming session. Once this transfer occurs, the streaming session with Gateway 1 will either terminate, requiring the user to restart the streaming session, or the streaming session experiences degradation in quality and performance because the streaming session has to go through an additional network hop to get from Gateway 1 to Gateway 2 and then by wireless to the client. Because of signal delays, the audio or A/V content experiences a glitch during this handoff.

An additional problem that can occur when plural gateways are in a home or other facility is maintenance on one of the gateway devices requiring a reboot of the gateway device. If content is streaming from a gateway that is scheduled to go offline for maintenance, there is not an easy way to make use of the remaining gateway to avoid an interruption in the streaming content.

DETAILED DESCRIPTION

Figure 1:
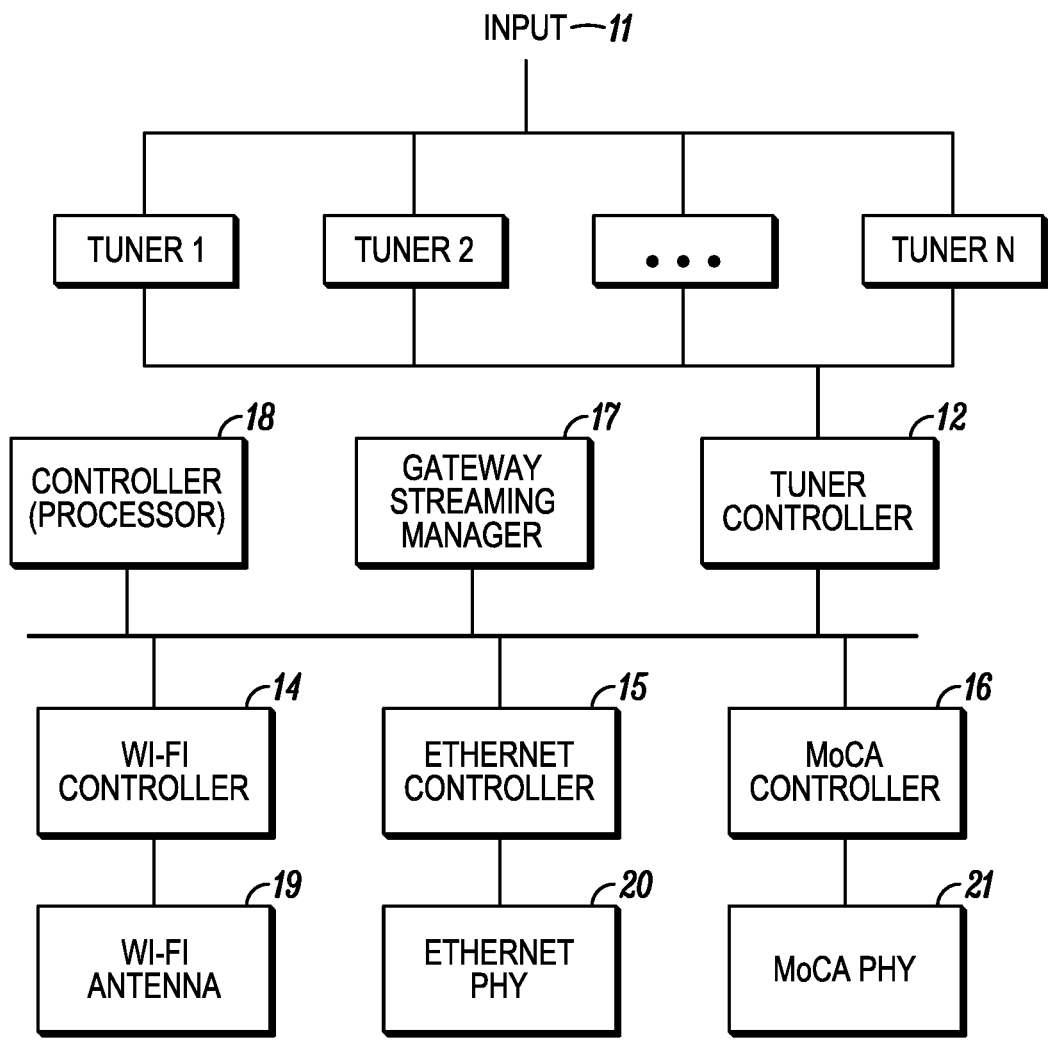
FIG. 1 is a block diagram of a content streaming apparatus, or gateway device.

A solution to the problems above is to implement a streaming session transfer procedure. As part of this procedure, one of the gateway devices is a gateway device that is configured and designated as a streaming manager which monitors streaming sessions on all of the gateway devices on the premises and also monitors the movements and network activity of the client devices. Using this information, the streaming manager transfers streaming sessions from one gateway to another, if resources are available.

The gateway device disclosed herein is a gateway device that is configured and can be designated as a streaming manager within a network. The gateway device monitors streaming sessions on all of the gateway devices on the premises and also monitors the movements and network activity of the client devices. Using this information, the streaming manager transfers streaming sessions from one gateway to another, if resources are available. The streaming manager can be implemented by a Gateway Streaming Manager (GSM) in one of plural content streaming apparatuses in the wireless network. Those of skill in the art will appreciate that any suitable wireless transmission protocol may be used, such as WiFi (IEEE 802.11), Bluetooth, 3GPP and 4G LTE, in the wireless network.

For the gateway maintenance problem described above, this session transfer procedure could be used to transfer streaming sessions from one gateway, that is scheduled for a reboot or is experiencing a failure that will soon result in a reset, to another gateway in the network. Additionally, depending on the wireless statistics and information that the Gateway Streaming Manager has access to, it performs network load balancing and takes actions early enough to prevent glitches and other issues that could occur during client wireless roaming.

A content streaming apparatus discussed above includes an input for receiving an input signal, a wireless controller configured to communicate via wireless with a client device and receive from the client device a streaming session request for streaming of requested content, and a plurality of tuners, each of which is configured to selectively tune to a portion of the input signal. The content streaming apparatus also includes a tuner controller configured to select an unused one of the tuners, and tune the selected tuner to receive the requested content from the input signal, and a controller configured to establish a streaming session with the client device via the wireless controller and send the requested content to the client device in the streaming session. The content streaming apparatus also include network connection circuitry, such as an Ethernet controller and Ethernet PHY, and/or a MoCA controller and MoCA PHY.

The content streaming apparatus includes a gateway streaming manager configured to: determine whether the client device has roamed out of a wireless zone of the content streaming apparatus into a wireless zone of another content streaming apparatus; and when the client device has roamed out the wireless zone of the content streaming apparatus, to send a tuner reservation instruction via the network connection circuitry to the other content streaming apparatus to instruct the other content streaming apparatus to reserve a tuner of the other content streaming apparatus. The gateway streaming manager is also configured to receive a tuner reservation confirmation from the other content streaming apparatus, and send an alternate streaming notification to the client device when the tuner reservation confirmation is received. The gateway streaming manager is configured to receive an alternate streaming acceptance from the client device, and end the streaming session between the content streaming apparatus and the client device when the alternate streaming acceptance is received.

In one configuration, the gateway streaming manager is further configured to: send, via the network connection circuitry to the other content streaming apparatus, requested content identification information and an instruction to tune the reserved tuner of the other content streaming apparatus to receive the requested content; and send a session instruction, via the network connection circuitry to the other content streaming apparatus, instructing the other content streaming apparatus to send the requested content to the client device in a streaming session between the client device and the other streaming apparatus.

When the content streaming apparatus is not designated as a streaming manager, the controller is configured to: receive a tuner reservation instruction from a designated-manager apparatus (e.g., another content streaming apparatus in the network that has been designated as the streaming manager) via the network connection circuitry. The controller is configured to instruct the tuner controller to reserve an unused one of the tuners. The tuner controller is configured to determine if there is an unused tuner available, and if so to indicate that a tuner is available. The controller is configured to send a tuner reservation confirmation to the designated-manager apparatus.

Also when the content streaming apparatus is not designated as the streaming controller, the controller is configured to receive, from the designated-manager apparatus via the network connection circuitry, requested content identification information and an instruction to tune the reserved tuner to receive the requested content, and instruct the tuner controller to tune the reserved tuner to receive the requested content. The tuner controller is configured to tune the reserved tuner to receive the requested content. The controller is configured to receive a session instruction via the network connection circuitry from the designated-manager apparatus and, in response to the session instruction, send the requested content in a streaming session to the client device that requested the content.

In another configuration, the controller is configured to receive, from the client device that requested the content, the requested content identification information and an instruction to tune the reserved tuner to receive the requested content, and instruct the tuner controller to tune the reserved tuner to receive the requested content. The tuner controller is configured to tune the reserved tuner to receive the requested content. The controller is configured to receive a session instruction from the client device that requested the content, and in response to the session instruction, send the requested content in a streaming session to the client device that requested the content.

FIG. 1 shows an example of a gateway device of the present invention. The gateway device is a content streaming apparatus that is a gateway to content, data, and any information accessible through signals on input 11. The input 11 may be an RF input that connects to a content provider, such as a television program provider, by terrestrial antenna, satellite dish, or wired cable. The gateway device includes a plurality of tuners, Tuner 1, Tuner 2, . . . Tuner N, each of which selectively tunes to a requested frequency or channel of content. A Tuner Controller 12 controls each tuner to tune to an instructed frequency or channel. The Tuner Controller 12 also determines whether an unused tuner is available, and if so, reserves a tuner as a destination tuner during a transfer of a streaming session from another gateway device.

The gateway device includes a controller 18, which could be implemented by an integrated circuit or circuits or by a processor, that converts content signals from the tuners to appropriate signals for wireless (e.g. Wifi or LTE) transmission via the wireless controller 14 and wireless antenna 19. The gateway device includes an Ethernet controller 15 and/or a MoCA controller 16 by which the gateway device can be networked with other gateway devices, or any other networking capable device. The Ethernet controller 15 and the MoCA controller 16 interface to the network via the Ethernet PHY (physical transceiver) 20 and MoCa PHY (physical transceiver) 21, respectively.

The gateway device also includes a Gateway Streaming Manager (GSM) 17, which monitors streaming sessions on all of the gateway devices in the network, and monitors the movements and network activity of the client devices.

The gateway device can be in the form of a so called "set top box" or may be built into a television or other media content playing apparatus.

Figure 2:
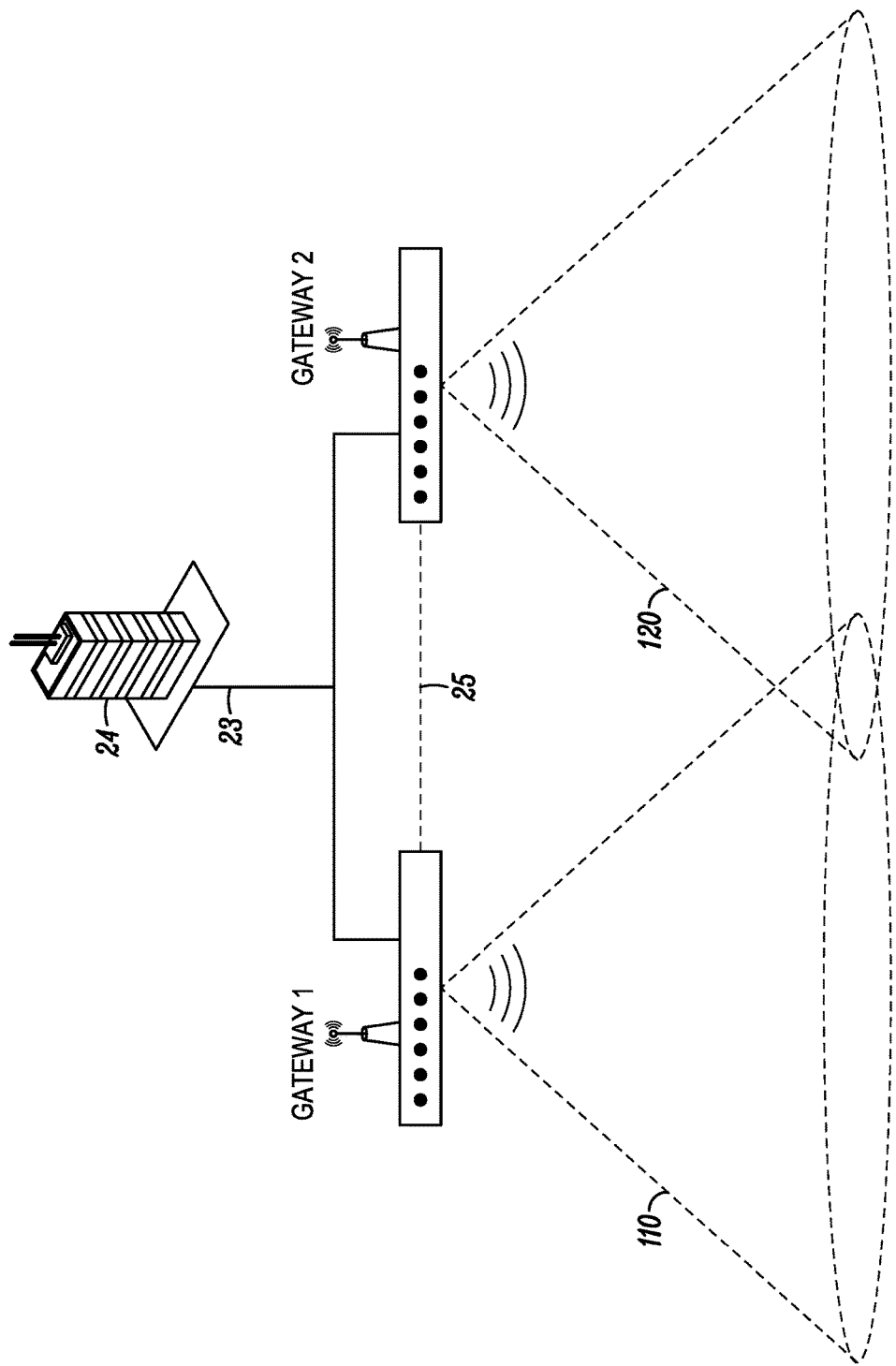
FIG. 2 shows an example of an overall system and devices therein according to the present invention.

FIG. 2 shows an example of an overall system and devices therein according to the present invention. The system has plural gateway devices, including, e.g., Gateway 1 and Gateway 2, each of which constitutes a Basic Service Set (BSS) for a wireless LAN (Local Area Network), and which together implement an Extended Service Set (ESS). The ESS forms a wireless network of the interconnected wireless BSSs of Gateway 1 and Gateway 2.

Gateway 1 and Gateway 2 are connected to a content provider 24, such as a cable television provider, via, for example, an inband QAM (Quadrature Amplitude Modulation) connection. This connection is through input 11 shown in FIG. 1. Each gateway includes plural tuners, for example six QAM tuners, to enable tuning to plural cable television channels simultaneously.

Gateway 1 and Gateway 2 are also connected to each other, for example via a wired network connection 25, via Ethernet controller 15 and Ethernet PHY 20, or MoCA controller 16 and MoCA PHY 21. Through this connection Gateway 1 and Gateway 2 establish a communication connection with each other, and establish which gateway device is designated as the active gateway streaming manager. The GSM 17 of the gateway device designated as the gateway streaming manager monitors streaming sessions on all of the gateway devices on the premises, and monitors the movements and network activity of the client devices. The GSM 17 monitors and collects information from all the devices in the home network, including client devices, other gateways, and the gateway device that includes the GSM 17 and that is designated as the active gateway streaming manager. The information can include the number of client devices connected by wireless to each gateway device, how many streaming sessions each gateway device is engaged in, the frequency or channel each tuner is tuned to, the signal strengths of the gateway devices and client devices, and any other known diagnostic information for the wireless protocol (e.g. Wifi, LTE, etc.).

In the example shown in FIG. 2, the two gateway devices, Gateway 1 and Gateway 2, form an ESS of a LAN. Gateway 1 is designated as the active gateway streaming manager and monitors streaming sessions on all of the gateway devices on the premises, including Gateway 1 and Gateway 2. The GSM 17 of Gateway 1 starts monitoring wireless clients (e.g., mobile devices) and any streaming sessions on the home network. In the example shown in FIG. 2, Gateway 1 has no wireless clients and no streaming sessions, and Gateway 2 also has no wireless clients and no streaming sessions.

Figure 3:
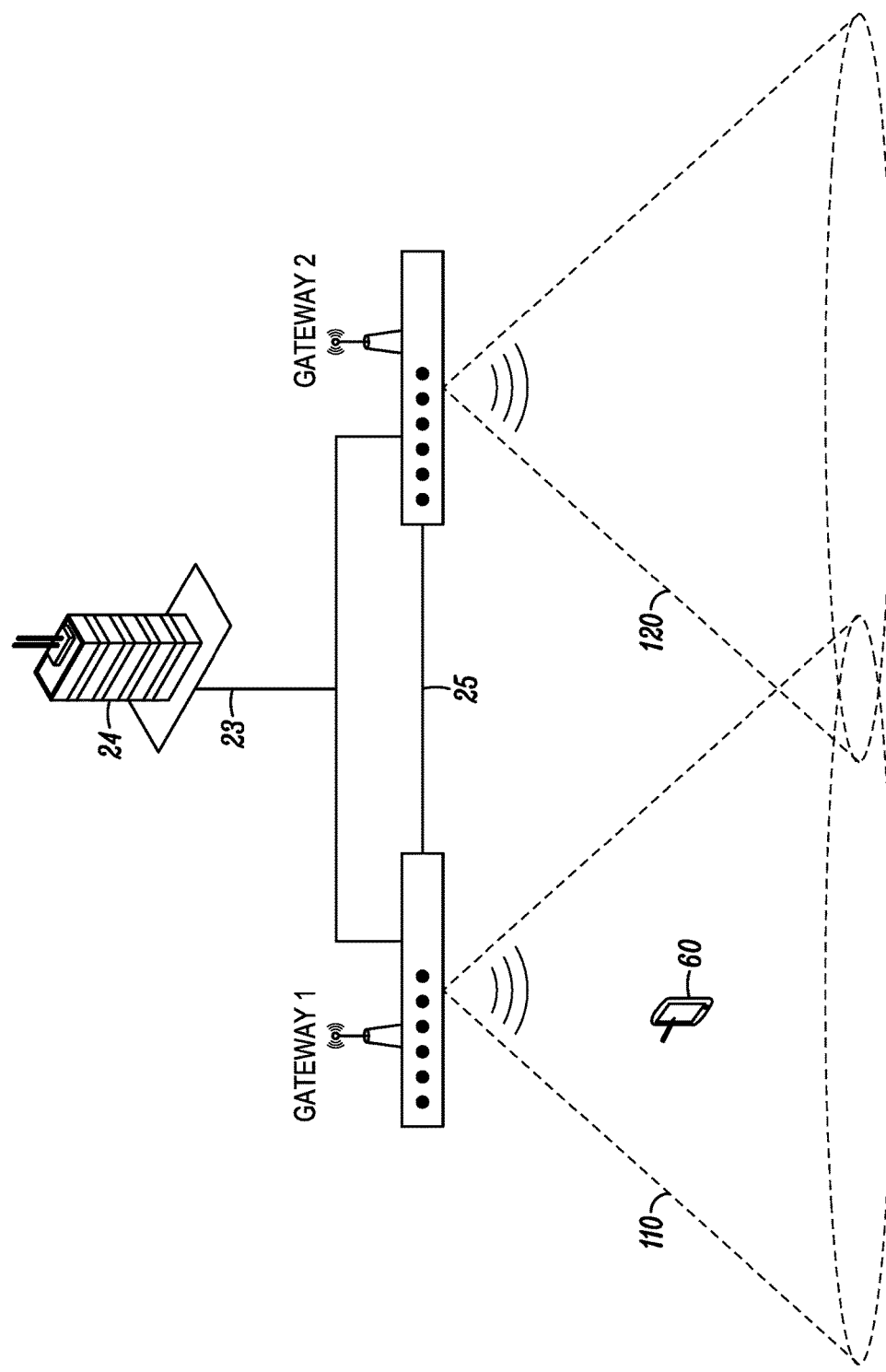
FIG. 3 shows an example of the system in which a wireless client device is brought into the wireless zone of Gateway 1.

In the example shown in FIG. 3, a wireless client device 60 is brought into the wireless zone 110 of Gateway 1. The client device 60 joins the home network by wirelessly connecting by wireless to Gateway 1. Therefore, in the example shown in FIG. 3, Gateway 1 has one wireless client and no streaming sessions, and Gateway 2 has no wireless clients and no streaming sessions.

Figure 4:
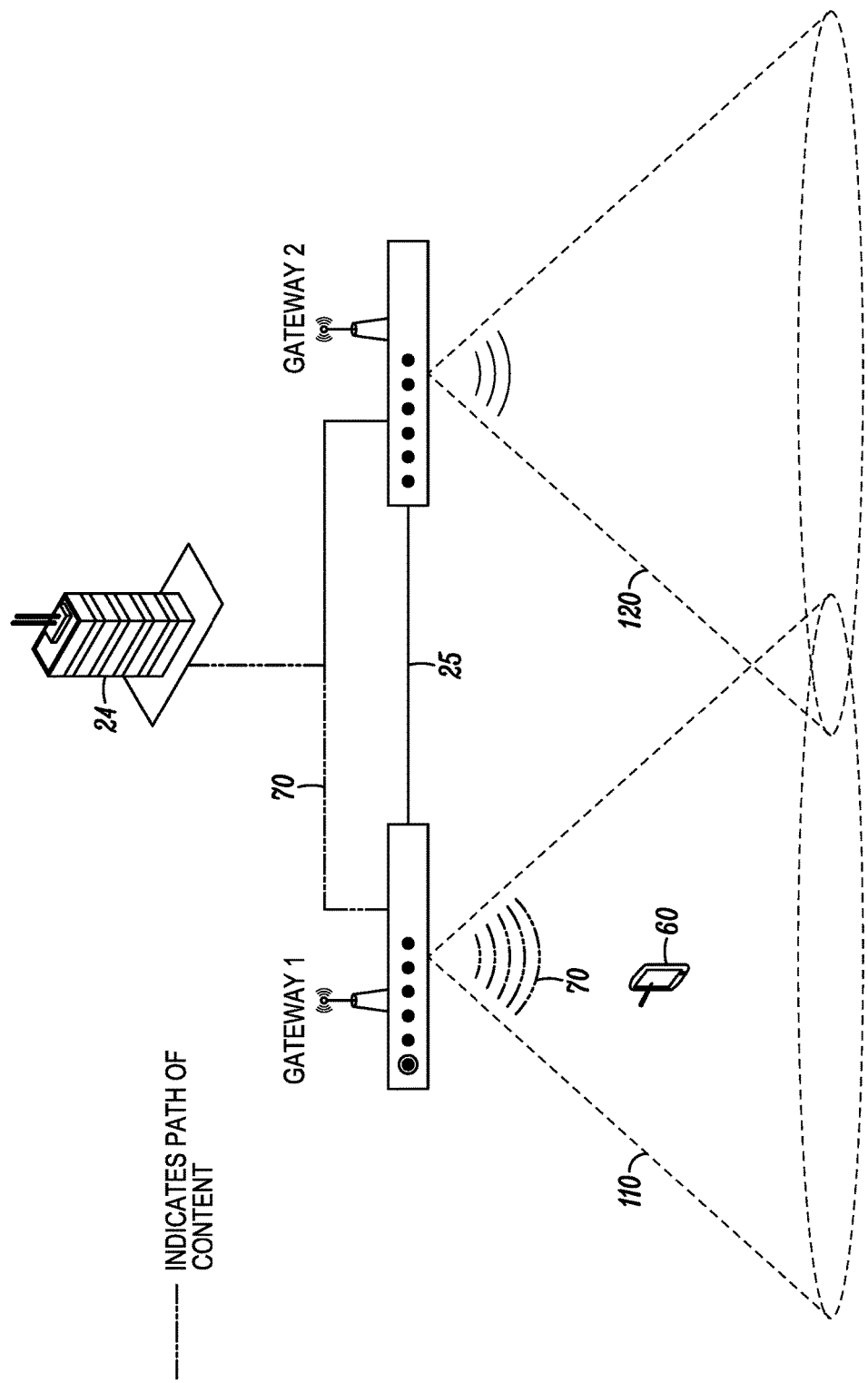
FIG. 4 shows an example of content routed from the content provider to the client device.

In the example shown in FIG. 4, the client device 60 sends a live streaming request to Gateway 1 and requests streaming of a particular content, such as a television program, movie, or sporting event, or requests streaming of a particular cable television channel. Gateway 1 establishes a streaming session with the client device 60, performs tuning to the requested content via one of the tuners, Tuner 1-Tuner N, of Gateway 1, and starts sending the streaming content over wireless to the client device 60. In the example shown in FIG. 4, the path 70 of the content is from the cable television provider 24, through the inband QAM connection, through Gateway 1, and over wireless wireless radio signal to the client device 60. In FIG. 4, Gateway 1 has one wireless client and one streaming session, and Gateway 2 has no wireless clients and no streaming sessions.

Figure 5:
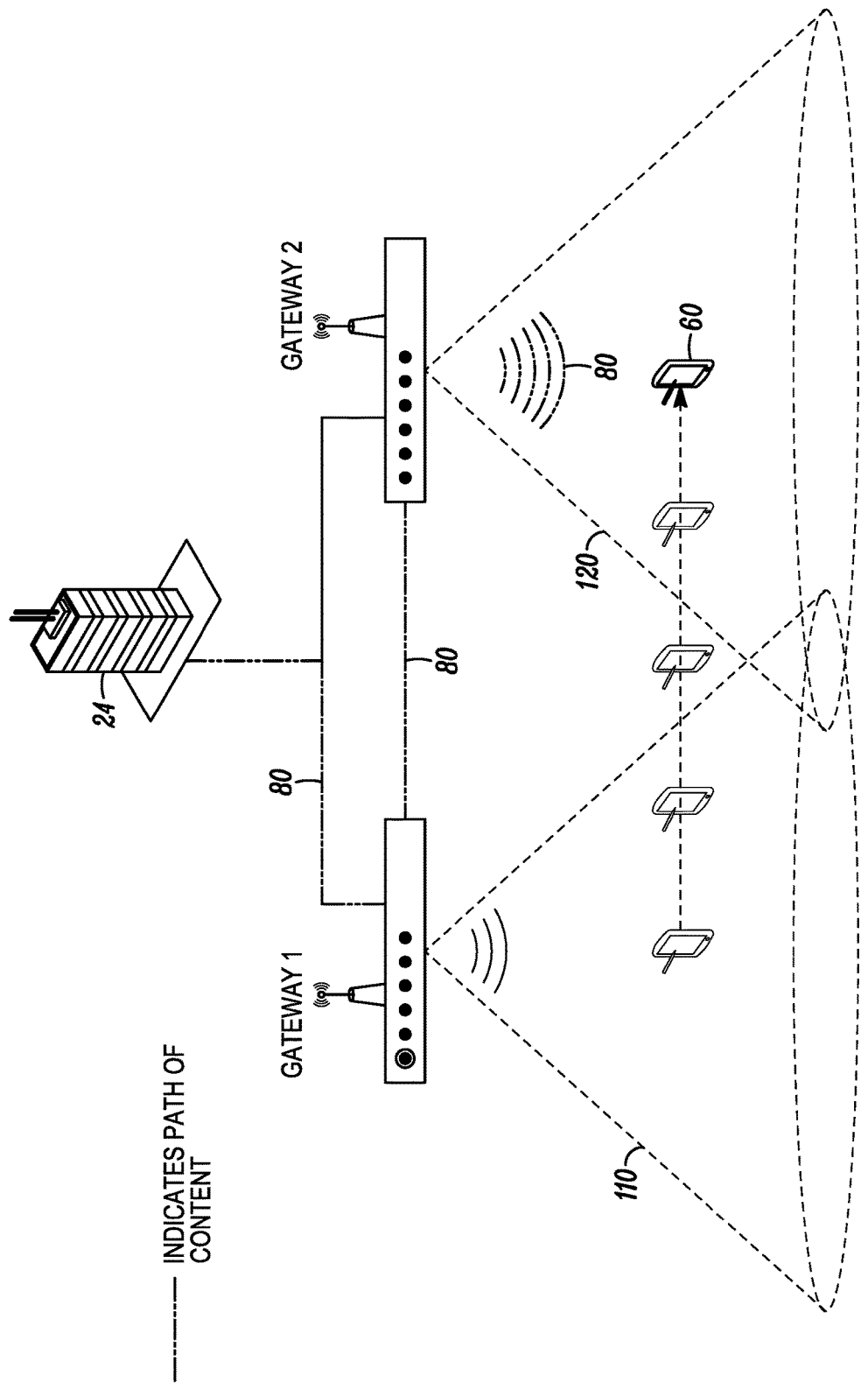
FIG. 5 shows an example after the client device has roamed into the zone of Gateway 2, and the content routed to the client device with a network jump from Gateway 1 to Gateway 2.

A convenience and advantage of mobile client devices is that the user can roam throughout the home or facility and maintain connection via wireless roaming. As shown in FIG. 5, when the client device 60 is moved, for example, from its previous location in wireless zone 110 of Gateway 1 to its new location in wireless zone 120 of Gateway 2, the wireless connection is migrated within the same ESS to Gateway 2, which will provide higher signal strength and better service than Gateway 1 when the client device 6 is in zone 120.

However, as shown in FIG. 5, without any intervention by the GSM 17 of Gateway 1, the path 80 of the content must make a network jump over the wired connection between Gateway 1 and Gateway 2. The path 80 of the content is from the cable television provider 24, through the inband QAM connection, through Gateway 1, over the wired network connection between Gateway 1 and Gateway 2 via the network connection circuitry of Gateway 1 (e.g., Ethernet Controller 15 and Ethernet PHY 20, or via Moca Controller 16 and MoCA PHY 21), through the network connection circuitry of Gateway 2, and finally over wireless wireless radio signal to the client device 60. Therefore, Gateway 1 remains engaged with client device 60 in a streaming session, but the wireless connection is between the client device 60 and Gateway 2. Thus, in FIG. 5, Gateway 1 has no wireless client but one streaming session, and Gateway 2 has one wireless client and no streaming sessions.

Because a wireless handoff occurs from Gateway 1, which remains the content source point for the streaming session, to the Gateway 2, the resulting additional network jump over the wired network connection between Gateway 1 and Gateway 2 causes a delay which could cause the streaming session between Gateway 1 and the client device 60 to terminate, or require the user to restart the streaming session manually with Gateway 2. Even if the streaming session between the client device 60 and Gateway 1 is not terminated, because of the added network jump, the streaming session may experience degradation in quality and performance, there will be unnecessary increase in the load on the network between the gateways, and additional latency may be present in the connection to the client device 60. The delays may cause the audio or A/V content to experience a glitch during the wireless handoff.

In such a situation, the GSM 17 of Gateway 1 detects via wireless protocols and diagnostic information that the client device 60 has roamed from the coverage zone 110 of Gateway 1 to the coverage zone 120 of Gateway 2. Based on this detection, the GSM 17 transfers the streaming session to Gateway 2, which serves to reduce the network load and improve the streaming session latency.

Figure 6:
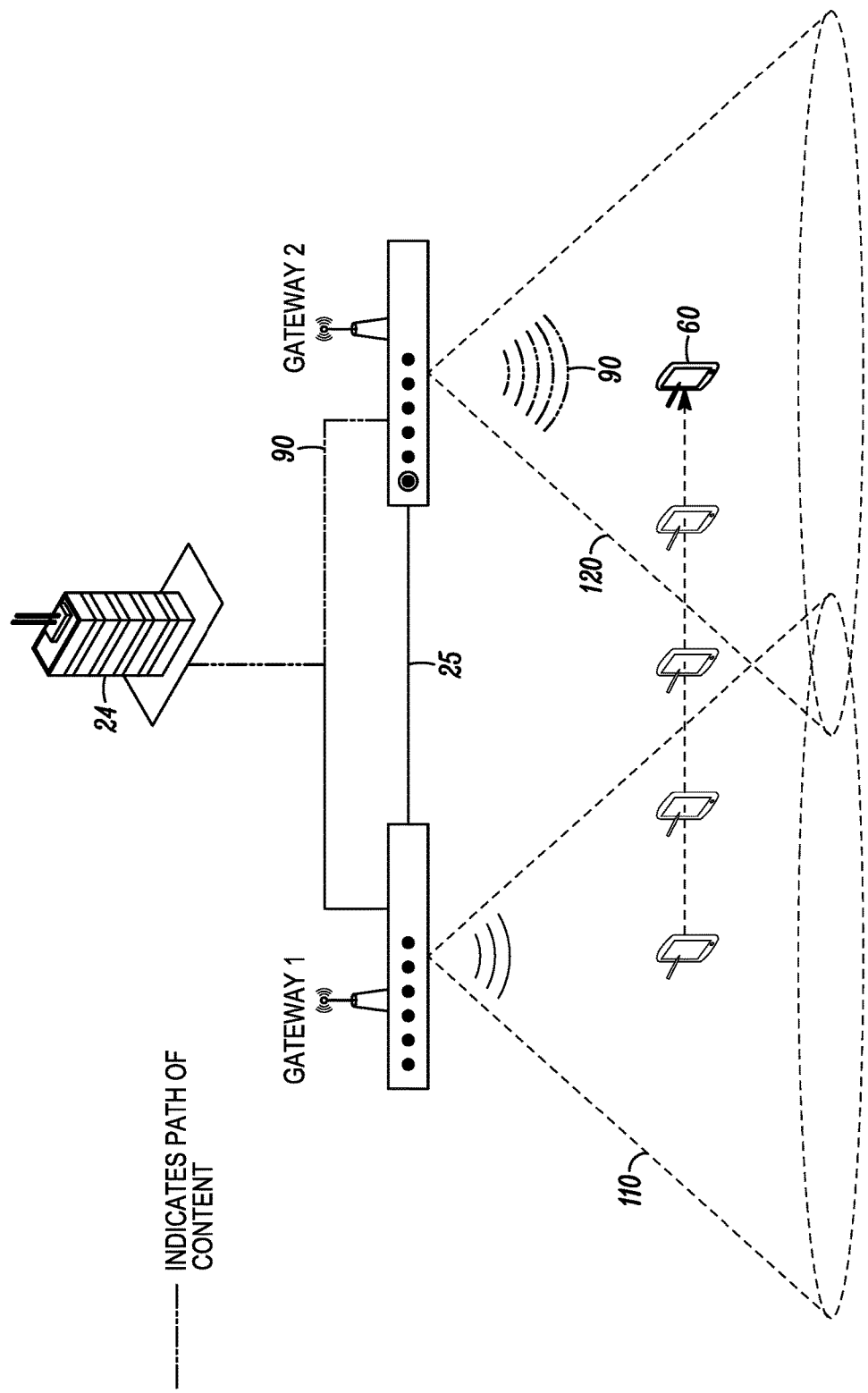
FIG. 6 shows an example after the streaming session has been transferred from Gateway 1 to Gateway 2.

To transfer the streaming session from Gateway 1 to Gateway 2, the GSM 17 of Gateway 1 reserves streaming resources via the Tuner Controller 12 of Gateway 2. The GSM 17 of Gateway 1 instructs Gateway 2 to perform tuning via the Tuner Controller 12 of Gateway 2 to the content of the existing streaming session via the reserved tuner, and sends an alternate streaming option notification to the client device 60. The client device 60 receives the alternate streaming option notification and establishes a new streaming session with Gateway 2, then terminates the streaming session with Gateway 1, and sends a notification of the change to the GSM 17 of Gateway 1. Therefore, as shown in FIG. 6, the route 90 of the streaming content is from the cable television provider 24, to Gateway 2 via the inband QAM connection, and to the client device 60 by wireless wireless radio signal from Gateway 2. As a result of the transfer of the streaming session from Gateway 1 to Gateway 2, as shown in FIG. 6, Gateway 1 has no wireless client and no streaming session, and Gateway 2 has one wireless client and one streaming session.

Figure 7:
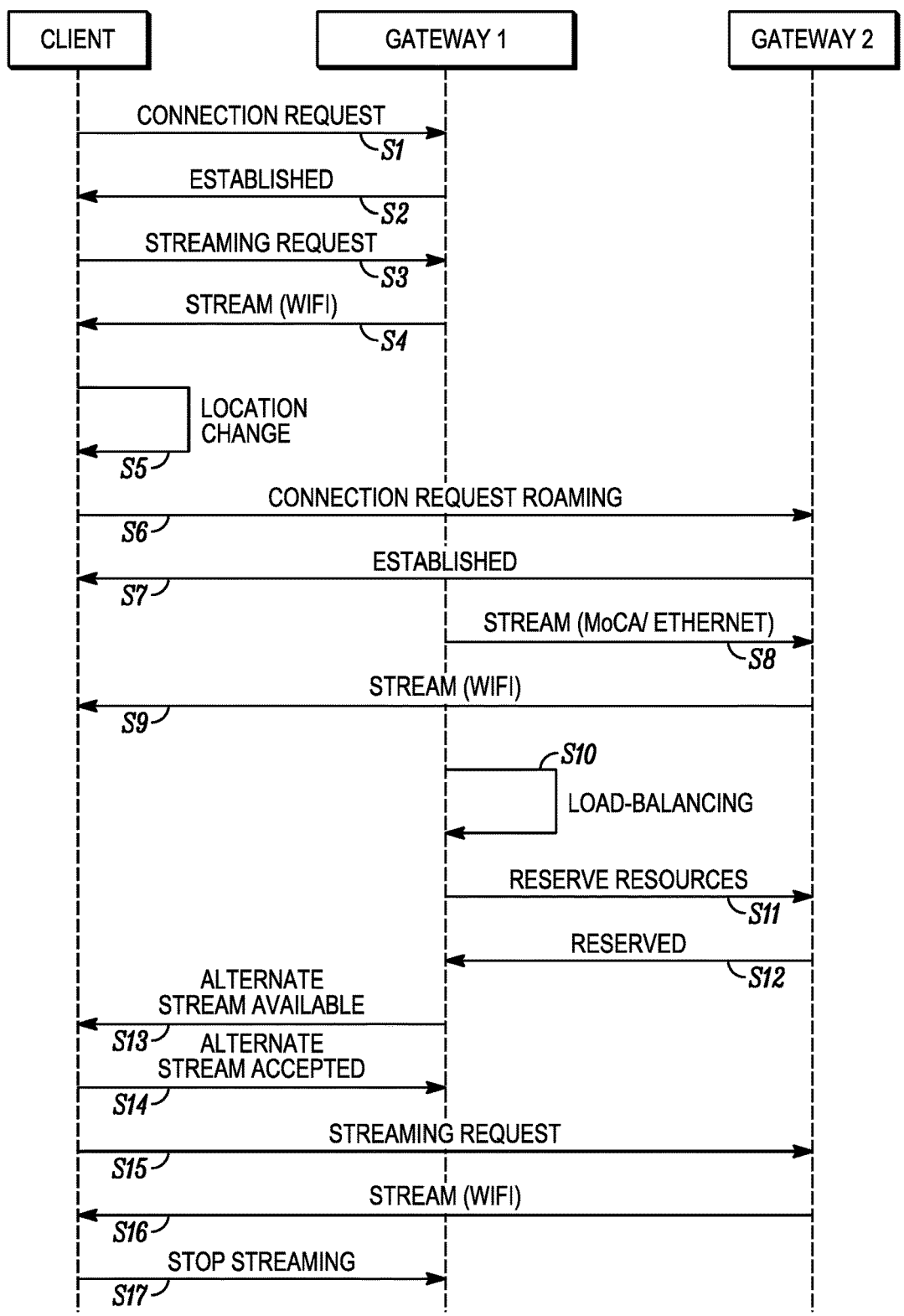
FIG. 7 shows an example of the timing of a streaming session transfer caused by a location change of the client device.

FIG. 7 illustrates timing of a streaming session transfer from Gateway 1 to Gateway 2 caused by a location change of client device 60. In step S1, the client device 60 sends a connection request to Gateway 1, based on which an initial connection between the client device 60 and Gateway 1 is established at step S2. After the connection is established, the client device 60 sends a streaming request to Gateway 1 at step S3, and Gateway 1 starts streaming of data by wireless between Gateway 1 and client device 60.

When, at step S5, the location of client device 60 is changed and client device 60 is moved to a position in which Gateway 2 provides better service (e.g., signal strength) than Gateway 1, the client device 60 initiates a roaming connection request to Gateway 2, at step S6, in order to migrate its connection within the ESS to Gateway 2, and the connection between the client device 60 and Gateway 2 is established at step S7.

The Gateway Streaming Manager GSM 17 of Gateway 1 also monitors the movements and network activity of the client devices. The GSM 17 of Gateway 1 detects that the client device 60 switched from Gateway 1 to Gateway 2, but keeps streaming from Gateway 1 to Gateway 2 via the wired network connection, e.g., using Ethernet controller 15 or MoCA controller 16, at step S8. Gateway 2 sends the streaming content via wireless to the client device 60 at step S9. As discussed above, this unnecessarily loads the network between gateways and adds additional latency to the connection. The GSM 17 of Gateway 1 detects this situation as a need for load balancing at step S10 and makes a determination to transfer the streaming session to Gateway 2 in order to reduce the network load and improve the streaming session latency.

To transfer the streaming session, the GSM 17 performs the following operations.

The GSM 17 of Gateway 1 attempts to reserve streaming resources, such as a tuner, transcoder, etc., via the Tuner Controller 12 of Gateway 2 at step S11 (any of the tuners in the gateway devices may be a tuner or a transcoder). Once a streaming resource, (such as Tuner 1, e.g., a QAM tuner), in Gateway 2 is successfully reserved at step S12, the GSM 17 of Gateway 1 sends the alternate streaming option notification to the client device 60 at step S13. Prior to sending the alternate streaming option notification, the GSM 17 can also be configured to instructs Gateway 2 to perform tuning to the content of the existing streaming session via the reserved tuner (Tuner 1). Alternatively, the instruction to Gateway 2 to perform tuning to the requested content may come from the client device.

Once the client device 60 indicates acceptance of the alternate streaming option to the GSM 17 at step S14, the client device 60 requests a new streaming session with Gateway 2 at step S15, and Gateway 2 begins streaming the content from the reserved tuner (Tuner 1) via wireless to the client device 60 at step S16. The client device 60 then terminates the streaming session with Gateway 1 and sends a notification to the GSM 17 at step S17.

If the client device 60 rejects the alternate streaming option, it sends a notification to the GSM 17 indicating that the alternate streaming option is not accepted. The GSM 17 in turn instructs Gateway 2 to release the previously reserved streaming resources (Tuner 1).

With such a gateway system manager in a system as shown in FIGS. 1-5, if a user is experiencing content from a television provider via a wireless streaming session on a client device, and the user moves to another location in the house or other facility within the ESS, the user is able to keep the streaming session playing even as the user moves out of the zone of one gateway device into the zone of another gateway device in the ESS without experiencing glitches, increased latency or signal degradation.

Also, the system allows proper balancing of the load on the tuners. Consider a scenario where a facility has an ESS with two gateway devices, Gateway 1 and Gateway 2, like the system shown in FIGS. 2-6, and that each gateway includes 4 tuners for cable television. If three client devices begin streaming in zone 110 of Gateway 1, and are then moved to zone 120 of Gateway 2, and if the streaming sessions are not transferred, the streaming sessions remaining between Gateway 1 and the three client devices continue to tie up three tuners of Gateway 1 even though they are no longer in the wireless zone of Gateway 1, but are in wireless communication with the network via Gateway 2. This causes unnecessary data communication over the wired network connection between Gateway 1 and Gateway 2. If two or more client devices attempt streaming connections from Gateway 1, the tuner limit will be exceeded and one or more of the client devices will not be able to establish a streaming connection of the television content, even though in this scenario there are four unused tuners in the ESS, i.e., on Gateway 2. By operation of the GSM 17, the streaming sessions of the first three users are transferred to tuners of Gateway 2 freeing up three of the tuners on Gateway 1, allowing users within zone 110 of Gateway 1 to use those tuners for streaming content, and eliminating the unnecessary transmission of the streaming content over the wired network connection between Gateway 1 and Gateway 2.

The system also allows streaming sessions to be moved from one gateway device to another in situations where a gateway device is offline. For example, if a gateway device is offline due to a malfunction, or is intentionally taken offline for a software update that requires a gateway reboot and hard reset, the GSM 17 can automatically transfer any streaming sessions that are occurring on that gateway device to another gateway device to allow seamless continued presentation of the streaming sessions on the client device 60.

The client device 60 can be any device that can communicate via wireless and stream audio or audio/video content, such as a music player, a mobile phone, a tablet device, a notebook device, a laptop computer, a desktop computer, or a gaming system.

The gateway devices can be content streaming apparatuses.

The streaming content can be audio content, A/V content, or any multimedia content.

The present invention can be implemented not only as an apparatus or apparatuses, but also as a method including the steps conducted by the GSM 17, gateway devices, and/or client devices 60, as discussed above and illustrated in FIGS. 2-6 and/or FIG. 7, which methods as discussed above constitute examples of algorithms. The invention can also be implemented as a program on a non-transitory computer-readable medium for causing a computer to execute such steps. The non-transitory computer-readable recording medium could be, for example, a CD-ROM, DVD, Bluray disc, or an electronic memory device.

The present invention may be implemented as any combination of a system, a method, an integrated circuit, and a computer program on a non-transitory computer readable recording medium.

The content streaming apparatuses, gateway devices, and the GSM may be in the form of a set-top box or other standalone device, or may be incorporated in a television or other content playing apparatus, or other device and the scope of the present invention is not intended to be limited on such forms.

The components of the content streaming apparatuses, gateway devices, and GSM may be implemented as Integrated Circuits (IC), Application-Specific Integrated Circuits (ASIC), or Large Scale Integrated circuits (LSI), system LSI, super LSI, or ultra LSI components which perform a part or all of the functions of the GSM, and gateway devices. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms illustrated in FIGS. 2-6, and/or FIG. 7 is illustrative, and algorithms having a sequence other than the above described sequences are contemplated. Moreover, steps, or parts of the algorithm, may be implemented simultaneously or in parallel.

It is also contemplated that the implementation of the components of the present invention can be done with any newly arising technology that may replace any of the above implementation technologies.

We claim:

1. A content streaming apparatus comprising:
an input for receiving an input signal;
a wireless controller configured to communicate via wireless with a client device, and receive from the client device a streaming session request for streaming of requested content;
a plurality of tuners, each of which is configured to selectively tune to a portion of the input signal;
a tuner controller configured to select an unused one of the tuners, and tune the selected tuner to receive the requested content from the input signal;
a controller configured to establish a streaming session with the client device via the wireless controller, and send the requested content to the client device in the streaming session;
network connection circuitry, wherein the network connection circuitry comprises an Ethernet controller and Ethernet PHY or a MoCA controller and MoCA PHY;
a gateway streaming manager configured to:
determine whether the client device has left a wireless zone of the content streaming apparatus and entered into a wireless zone of another content streaming apparatus,
when the client device has left the wireless zone of the content streaming apparatus, send a tuner reservation instruction via the network connection circuitry to the other content streaming apparatus to instruct the other content streaming apparatus to reserve a tuner of the other content streaming apparatus, and receive a tuner reservation confirmation from the other content streaming apparatus;
send an alternate streaming notification to the client device when the tuner reservation confirmation is received,
receive an alternate streaming acceptance from the client device, and
end the streaming session between the content streaming apparatus and the client device when the alternate streaming acceptance is received.

2. The content streaming apparatus according to claim 1, wherein the gateway streaming manager is further configured to:
send, via the network connection circuitry to the other content streaming apparatus, requested content identification information and an instruction to tune the reserved tuner of the other content streaming apparatus to receive the requested content; and
send a session instruction, via the network connection circuitry to the other content streaming apparatus, instructing the other content streaming apparatus to send the requested content to the client device in a streaming session between the client device and the other streaming apparatus.

3. The content streaming apparatus according to claim 1, wherein when the content streaming apparatus is not designated as a streaming manager, the controller is configured to:
receive, from a designated-manager apparatus via the network connection circuitry, a tuner reservation instruction;
instruct the tuner controller to reserve an unused one of the tuners in response to the tuner reservation instruction; and
send a tuner reservation confirmation to the designated-manager apparatus; and
wherein the tuner controller is configured to determine if there is an unused tuner available in response to the tuner reservation instruction, and if so to indicate to the controller that a tuner is available.

4. The content streaming apparatus according to claim 3, wherein the controller is configured to:
receive, from the designated-manager apparatus via the network connection circuitry, requested content identification information and an instruction to tune the reserved tuner to receive the requested content; and
instruct the tuner controller to tune the reserved tuner to receive the requested content;
wherein the tuner controller is configured to tune the reserved tuner to receive the requested content; and
wherein the controller is configured to:
receive a session instruction via the network connection circuitry from the designated-manager apparatus; and
in response to the session instruction, send the requested content in a streaming session to the client device that requested the content.

5. The content streaming apparatus according to claim 3, wherein the controller is configured to:
receive, from the client device that requested the content, requested content identification information and an instruction to tune the reserved tuner to receive the requested content; and
instruct the tuner controller to tune the reserved tuner to receive the requested content;
wherein the tuner controller is configured to tune the reserved tuner to receive the requested content; and
wherein the controller is configured to:
receive a session instruction from the client device that requested the content; and
in response to the session instruction, send the requested content in a streaming session to the client device that requested the content.

6. A content streaming method for use with a content streaming apparatus, said method comprising:
receiving an input signal;
communicating via a wireless controller with a client device, and receiving from the client device a streaming session request for streaming of requested content;

controlling, with a tuner controller, a plurality of tuners so as to select an unused one of the tuners and tune the selected tuner to receive the requested content from the input signal;

establishing, with a controller, a streaming session with the client device via the wireless controller, and sending the requested content to the client device in the streaming session, wherein the content streaming apparatus comprises network connection circuitry comprising an Ethernet controller and Ethernet PHY or a MoCA controller and MoCA PHY;

determining, with a gateway streaming manager, whether the client device has left a wireless zone of the content streaming apparatus and entered into a wireless zone of another content streaming apparatus, when the client device has left the wireless zone of the content streaming apparatus, sending a tuner reservation instruction via network connection circuitry to the other content streaming apparatus to instruct the other content streaming apparatus to reserve a tuner of the other content streaming apparatus, and receiving a tuner reservation confirmation from the other content streaming apparatus;

sending an alternate streaming notification to the client device when the tuner reservation confirmation is received, receiving an alternate streaming acceptance from the client device, and ending the streaming session between the content streaming apparatus and the client device when the alternate streaming acceptance is received.

7. The content streaming method according to claim 6, further comprising:

sending, via the network connection circuitry to the other content streaming apparatus, requested content identification information and an instruction to tune the reserved tuner of the other content streaming apparatus to receive the requested content; and sending a session instruction, via the network connection circuitry to the other content streaming apparatus, instructing the other content streaming apparatus to send the requested content to the client device in a streaming session between the client device and the other streaming apparatus.

8. The content streaming method according to claim 6, further comprising, when the content streaming apparatus is not designated as a streaming manager:

receiving, from a designated-manager apparatus via the network connection circuitry, a tuner reservation instruction;

instructing the tuner controller to reserve an unused one of the tuners in response to the tuner reservation instruction; and sending a tuner reservation confirmation to the designated-manager apparatus; and determining, with the tuner controller, if there is an unused tuner available in response to the tuner reservation instruction, and if so to indicating to the controller that a tuner is available.

9. The content streaming method according to claim 8, further comprising:

receiving, from the designated-manager apparatus via the network connection circuitry, requested content identification information and an instruction to tune the reserved tuner to receive the requested content; and instructing the tuner controller to tune the reserved tuner to receive the requested content;

tuning, with the tuner controller, the reserved tuner to receive the requested content;

receiving a session instruction via the network connection circuitry from the designated-manager apparatus; and in response to the session instruction, sending the requested content in a streaming session to the client device that requested the content.

10. The content streaming method according to claim 8, further comprising:

receiving, from the client device that requested the content, requested content identification information and an instruction to tune the reserved tuner to receive the requested content; and instructing the tuner controller to tune the reserved tuner to receive the requested content;

tuning, with the tuner controller, the reserved tuner to receive the requested content;

receiving a session instruction from the client device that requested the content; and in response to the session instruction, sending the requested content in a streaming session to the client device that requested the content.

11. A non-transitory computer readable recording medium having stored thereon a program for causing a computer to implement a content streaming method for use with a content streaming apparatus, said method comprising:

receiving an input signal;

communicating via a wireless controller with a client device, and receiving from the client device a streaming session request for streaming of requested content;

controlling, with a tuner controller, a plurality of tuners so as to select an unused one of the tuners and tune the selected tuner to receive the requested content from the input signal;

establishing, with a controller, a streaming session with the client device via the wireless controller, and sending the requested content to the client device in the streaming session wherein the content streaming apparatus comprises network connection circuitry comprising an Ethernet controller and Ethernet PHY or a MoCA controller and MoCA PHY;

determining, with a gateway streaming manager, whether the client device has left a wireless zone of the content streaming apparatus and entered into a wireless zone of another content streaming apparatus, when the client device has left the wireless zone of the content streaming apparatus, sending a tuner reservation instruction via network connection circuitry to the other content streaming apparatus to instruct the other content streaming apparatus to reserve a tuner of the other content streaming apparatus, and receiving a tuner reservation confirmation from the other content streaming apparatus;

sending an alternate streaming notification to the client device when the tuner reservation confirmation is received, receiving an alternate streaming acceptance from the client device, and ending the streaming session between the content streaming apparatus and the client device when the alternate streaming acceptance is received.

12. The non-transitory computer readable recording medium according to claim 11, wherein the method further comprises:

sending, via the network connection circuitry to the other content streaming apparatus, requested content identification information and an instruction to tune the reserved tuner of the other content streaming apparatus to receive the requested content; and sending a session instruction, via the network connection circuitry to the other content streaming apparatus, instructing the other content streaming apparatus to send the requested content to the client device in a streaming session between the client device and the other streaming apparatus.

13. The non-transitory computer readable recording medium according to claim 11, wherein the method further comprises, when the content streaming apparatus is not designated as a streaming manager:

receiving, from a designated-manager apparatus via the network connection circuitry, a tuner reservation instruction;

instructing the tuner controller to reserve an unused one of the tuners in response to the tuner reservation instruction; and sending a tuner reservation confirmation to the designated-manager apparatus; and determining, with the tuner controller, if there is an unused tuner available in response to the tuner reservation instruction, and if so to indicating to the controller that a tuner is available.

14. The non-transitory computer readable recording medium according to claim 13, wherein the method further comprises:

receiving, from the designated-manager apparatus via the network connection circuitry, requested content identification information and an instruction to tune the reserved tuner to receive the requested content; and instructing the tuner controller to tune the reserved tuner to receive the requested content;

tuning, with the tuner controller, the reserved tuner to receive the requested content;

receiving a session instruction via the network connection circuitry from the designated-manager apparatus; and in response to the session instruction, sending the requested content in a streaming session to the client device that requested the content.

15. The non-transitory computer readable recording medium according to claim 13, wherein the method further comprises:

receiving, from the client device that requested the content, requested content identification information and an instruction to tune the reserved tuner to receive the requested content; and instructing the tuner controller to tune the reserved tuner to receive the requested content;

tuning, with the tuner controller, the reserved tuner to receive the requested content;

receiving a session instruction from the client device that requested the content; and in response to the session instruction, sending the requested content in a streaming session to the client device that requested the content.

* * * * *